(12) United States Patent
Shkurko

(10) Patent No.: US 11,741,658 B2
(45) Date of Patent: Aug. 29, 2023

(54) FRUSTUM-BOUNDING VOLUME INTERSECTION DETECTION USING HEMISPHERICAL PROJECTION

(71) Applicant: ADVANCED MICRO DEVICES, INC., Santa Clara, CA (US)

(72) Inventor: Konstantin Igorevich Shkurko, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 43 days.

(21) Appl. No.: 17/564,186

(22) Filed: Dec. 28, 2021

(65) Prior Publication Data

US 2023/0206544 A1 Jun. 29, 2023

(51) Int. Cl.
| | | |
|---|---|---|
| *G06T 15/06* | (2011.01) | |
| *G06T 15/30* | (2011.01) | |
| *G06T 15/08* | (2011.01) | |
| *G06T 17/10* | (2006.01) | |
| *G06T 15/20* | (2011.01) | |

(52) U.S. Cl.
CPC .............. *G06T 15/06* (2013.01); *G06T 15/08* (2013.01); *G06T 15/20* (2013.01); *G06T 15/30* (2013.01); *G06T 17/10* (2013.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 10,607,404 | B2* | 3/2020 | Lecocq | G06T 1/20 |
| 2018/0262666 | A1* | 9/2018 | Koga | G01J 3/42 |
| 2019/0050971 | A1* | 2/2019 | Fukuda | H04N 1/407 |
| 2022/0189114 | A1* | 6/2022 | Aizenshtein | G06T 17/20 |
| 2023/0017276 | A1* | 1/2023 | Bakalash | G06T 19/006 |

OTHER PUBLICATIONS

J. Weeks, "Real-time rendering in curved spaces," in IEEE Computer Graphics and Applications, vol. 22, No. 6, pp. 90-99, Nov.-Dec. 2002, doi: 10.1109/MCG.2002.1046633 (Year: 2002).*
Overbeck, Ryan et al. "A Real-time Beam Tracer with Application to Exact Soft Shadows" Eurographics Symposium on Rendering, 2007, 14 Pages.

(Continued)

*Primary Examiner* — Nurun Flora

(57) ABSTRACT

A frustum bounds a subset of rays projected into a virtual scene to be rendered. The frustum is transformed from a Cartesian coordinate space to a spherical coordinate space using a transform matrix that places a central ray of the frustum as the Z-axis. A projection hemisphere centered around the central ray is defined. The extents of the intersection of the transformed frustum and the surface of the projection hemisphere are bound by a frustum circle. A geometric object in the scene or a bounding volume is bound by a bounding sphere, which is transformed into the spherical coordinate system using the transform matrix, and then projected onto the surface of the projection sphere to define a bounding circle. The frustum is identified as intersecting the geometric object or bounding volume responsive to angular overlap and distance overlap between the frustum circle and the bounding circle.

21 Claims, 8 Drawing Sheets

(56) References Cited

OTHER PUBLICATIONS

Heckbert, Paul and Pat Hanrahan "Beam Tracing Polygonal Objects" Proc. SIGGRAPH '84, 1984, 23 Pages.
Reshetov, Alexander et al. "Multi-Level Ray Tracing Algorithm" ACM Trans. Graph. 24(3): 1176-1185, 2005, 10 pages.
Crassin, Cyril et al., "Interactive Indirect Illumination Using Voxel Cone Tracing" Computer Graphics Forum (Proceedings of Pacific Graphics 2011), vol. 30, No. 7—Sep. 2011.

* cited by examiner

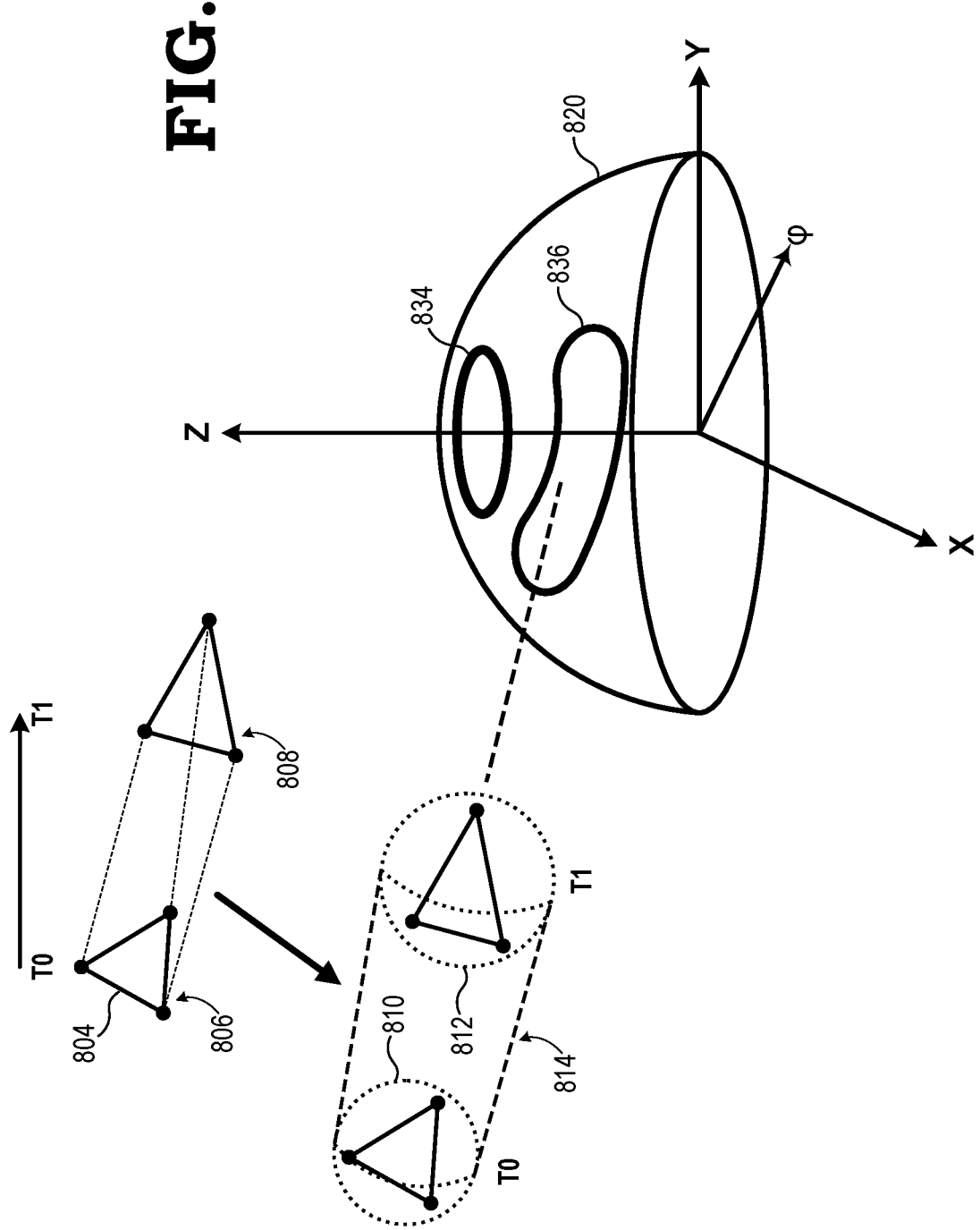

FRUSTUM-BOUNDING VOLUME INTERSECTION DETECTION USING HEMISPHERICAL PROJECTION

BACKGROUND

Ray tracing and other ray traversal processes often rely on the use of a bounding volume hierarchy (BVH), which is a tree structure representing a set of geometric objects within a scene to be rendered. The geometric objects (e.g., triangles or other primitives) are enclosed in bounding boxes or other bounding volumes that form leaf nodes of the tree structure, and then these nodes are grouped into small sets, with each set enclosed in their own bounding volumes that represent a parent node on the tree structure, and these small sets then are bound into larger sets that are likewise enclosed in their own bounding volumes that represent a higher parent node on the tree structure, and so forth, until there is a single bounding volume representing the top node of the tree structure and which encompasses all lower-level bounding volumes.

The BVH is then used to identify potential intersections between generated rays and the geometric objects in the scene by traversing the nodes of the BVH, where at each node being traversed a ray of interest is compared with the bounding volume of that node to determine if there is an intersection, and if so, continuing on to the next node in the corresponding branch, and so forth. Thus, if no intersection is detected for a bounding volume of a higher parent node, the intersection algorithm can correctly conclude that the ray of interest will likewise not intersect any of the smaller bounding volumes of the lower-level child nodes reached from that parent node and thus may skip further traversal of that branch of the tree structure. While the use of a BVH can provide for more efficient ray-object intersection (or collision detection), in graphics systems with high frame rendering rates, high pixel resolution, and/or complex scenes, the sheer number of calculations required to perform the BVH traversal for a high number of rays per frame at a high number of frames per second can excessively tax the graphics resources of the system.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

FIG. 8 is a diagram illustrating another process for ray intersection for a geometric object subject to motion using a hemispherical-projection-based intersection test process in accordance with some embodiments.

DETAILED DESCRIPTION

Figure 1:
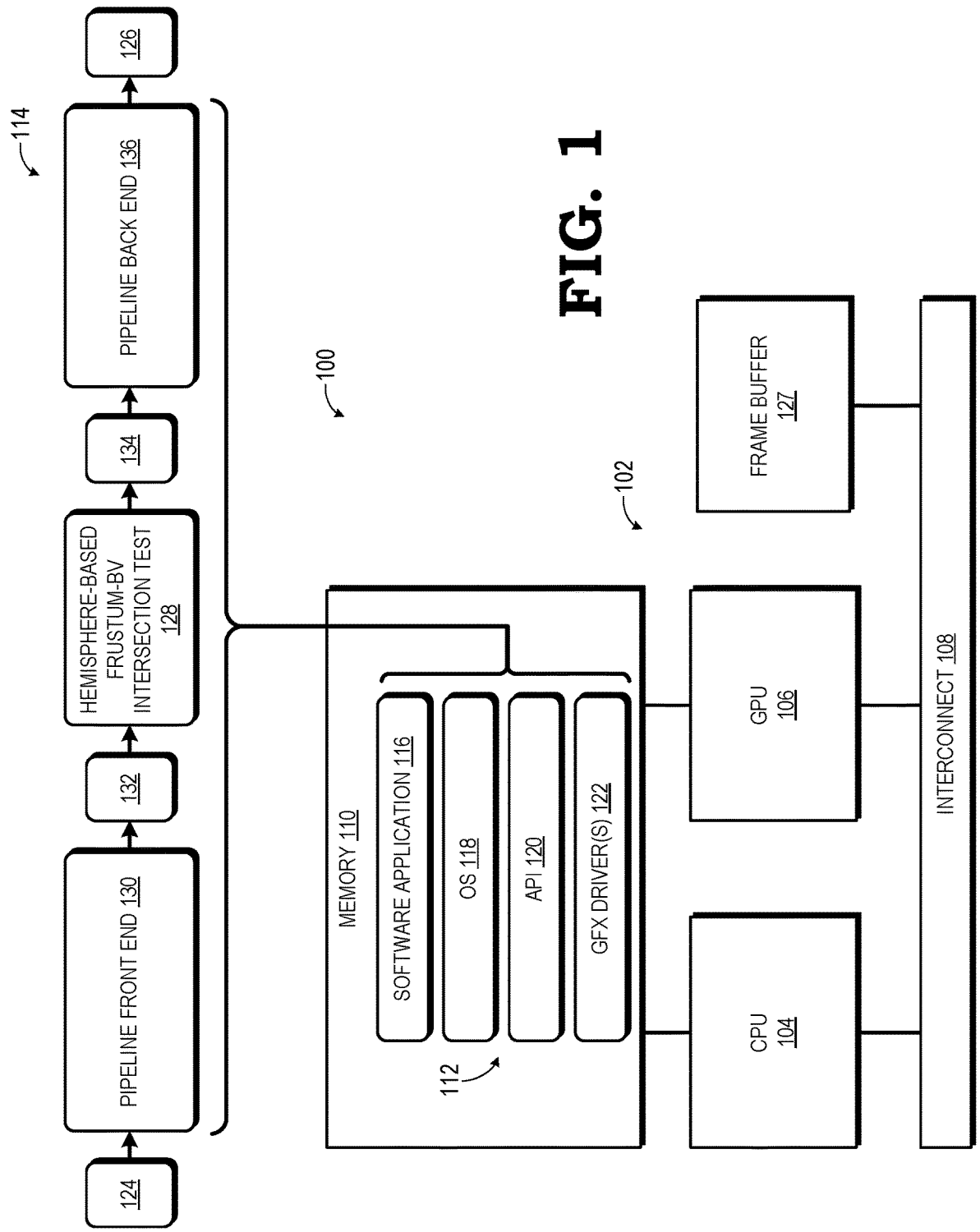
FIG. 1 is a block diagram of a processing system employing a graphics pipeline with frustum-bounding volume intersection detection using hemispherical projection in accordance with some embodiments.

Conventional BVH-based ray intersection techniques perform the BVH-traversal process separately for each ray of interest, resulting in a considerable volume of calculations. However, it can be observed that the rays for certain ray traversal workloads, like primary visibility, typically are highly coherent, where many rays originate in proximity to each other and traverse the scene in similar directions. As a result, some subsets of rays traverse through the BVH together and intersect the same node(s). Accordingly, to leverage the coherency of subsets of rays in such situations, the present disclosure describes systems and techniques in which a subset of rays are bound or otherwise collected into a frustum, and this frustum, rather than individual rays, is tested for the intersection at the nodes of the BVH until the frustum is determined to intersect a geometric object at a leaf node of the BVH. In the event that the frustum is determined to intersect a geometric object (e.g., a triangle or other primitive), the individual rays of the frustum then are tested against the geometric object to determine the intersection status for each ray with regard to the primitive. In this manner, much of the redundant calculations for each node traversal for each ray of a coherent subset may be avoided.

While this frustum-based BVH traversal process typically reduces the calculation workload compared to a ray-by-ray BVH traversal process, conventional frustum-bounding volume intersection processes typically involve a considerable number of compute operations. For example, a typical pyramid-based frustum utilizes Euclidian geometry and is defined by at least four planes in Cartesian space. Thus, to determine whether such a frustum intersects a bounding box (as one example of a bounding volume) requires thirty-two dot products to determine whether any corner of the bounding box is in the frustum (8 corners*4 planes), and further requires thirty-two compares to determine whether any edge of the bounding box straddles any of the frustum planes. This number of calculations increases significantly if the frustum further includes fifth and sixth planes as proximate and distal truncating planes.

In at least one embodiment, the frustum-bounding volume intersection test process described herein utilizes intersection testing using spherical projections in a spherical coordinate system rather than a Cartesian coordinate system-based approach. The frustum bounding a subset of rays is projected onto a hemisphere in spherical coordinate space. A circle of a sphere bounding the extent of the frustum at the surface of the hemisphere is identified as the frustum circle. A bounding volume hierarchy (BVH) determined for the geometric objects in the scene then is traversed, with the bounding box or other bounding volume at each encountered node is first bound by a sphere, and then the sphere is projected onto the surface of the hemisphere to identify the corresponding circle of a sphere as the bounding circle for the bounding volume. An intersection test is then performed to determine whether there is both angular overlap and distance between the frustum circle and the bounding circle. If both types of overlap are present, the frustum is identified as intersecting the corresponding bounding volume. Conversely, if the frustum circle and the bounding circle fail to exhibit either angular overlap or distance overlap, the frustum is identified as not intersecting the corresponding bounding volume. Depending on whether an intersection at a node is detected, the BVH traversal can continue, where for each leaf node representing a bounding volume for a geometric object (e.g., a triangle, a rectangle, a mesh, etc.) for which an intersection with the frustum is detected, the intersection test process then can proceed to evaluate each ray of the frustum against the geometry of the geometric object to determine whether there is a primitive-ray intersection for the ray of interest.

By projecting both the frustum and the bounding volume of interest onto a hemisphere in spherical coordinate space and analyzing the potential for intersection based on detection of distance and angular overlap between the resulting projected circles of a sphere, the techniques described herein can perform intersection testing using a BVH more efficiently than conventional Cartesian-based approaches as there are fewer dot product operations per frustum test compared to a conventional Cartesian test. While the frustum transformation matrix process involves additional operations, this cost is amortized across all of the BVH node tests. In particular, the approach described herein is consistent with the manner in which physically based materials generate secondary rays, such as area light shadows or global illumination reflections. Moreover, this approach is compatible with a variety of bounding volumes, in contrast to the majority of conventional techniques requiring use of axis-aligned bounding box (AABB).

FIG. 1 illustrates a processing system 100 utilizing a spherical-based frustum-bounding volume intersection test process in accordance with at least some embodiments of the present disclosure. As depicted by hardware configuration 102, the processing system 100 includes one or more central processing units (CPUs) 104 and one or more graphics processing units (GPUs) 106 interconnected via one or more interconnects 108 (e.g., a Peripheral Component Interconnect Express (PCIe) interconnect, an Infinity fabric, etc.), and connected to one or more memories 110, such as a system memory, a graphics memory, and the like. The processing system 100 further includes other components that are omitted from FIG. 1 for ease of illustration, such as one or more displays, keyboards, mice, and other input/output (I/O) devices and their corresponding controllers, memory controllers, power management components, and the like.

The one or more memories 110 store a software stack 112 that, when executed by the one or more CPUs 104 and one or more GPUs 106, implement a graphics pipeline 114 that operates to render a sequence of video frames representing video content, which can include the video content of a computer-generated imagery (CGI)-based video (e.g., a movie or television show), the video content of game play in a virtual world of a video game, and the like. The software stack 112 thus includes one or more software applications 116 that operates to manipulate the one or more CPUs 104 to generate a representation of a virtual scene that is to be rendered as a video frame or subsequence of frames from a particular viewpoint, and generates a representation of this virtual scene, including view point information, a 3D model of the scene in the form of information describing the scene and the geometric objects therein in the form of graphics primitives (e.g., triangles, rectangles, N-sided polygons, etc.), texture, lighting, shading, and motion information. The software application 116 then submits, via an operating system (OS) 118, this representation with associated rendering commands to one or more graphics application programming interfaces (APIs) 120 executing on the CPU(s) 104 via various function calls to the one or more APIs 120. Examples of such APIs 120 include Vulkan™, Microsoft DirectX™, OpenGL™, OpenCL™, and the like. The one or more APIs 120 in turn then coordinate with one or more graphics drivers 122 executing at the CPU(s) 104, such as user-mode graphics drivers and kernel-mode graphics drivers, to directly control and otherwise manipulate the GPU(s) 106 and other graphics acceleration hardware to perform corresponding operations in support of the rendering process of the graphics pipeline 114.

For each frame of a sequence of frames to be rendered, the graphics pipeline 114 operates to receive input 124 representing a virtual scene and associated information pertaining to how the frame is to be rendered from a viewpoint of that scene and to process the input 124 accordingly to render a corresponding rendered frame 126 that is then temporarily stored in a frame buffer 127 and then transmitted to a destination, such as by wired or wireless transmission via a display interface to a display device for display, transmitted to an encoder for encoding for storage, network transmission, or subsequent display, and the like. As such, the graphics pipeline 114 can implement a rasterization process or a ray tracing process (or both) for purposes of rendering frames. Either approach may utilize a ray-object intersection test for various purposes. For example, in a ray tracing process, the path of a light "ray" is traced from a viewpoint (the "camera") through a corresponding pixel of a two-dimensional (2D) plane (the image plane) into the three-dimensional (3D) virtual scene (object space or world space) and if and when that ray encounters (intersects or "hits") a geometric object in the scene, information about the point of impact on the geometric object's surface contributes to the pixel color and illumination of the pixel of the image plane through which the ray passed (and thus the color and illumination of the corresponding pixel in the rendered frame that is represented by the image plane). In a rasterization-based rendering process, a ray-object intersection test can be employed in, for example, various culling operations, such as view frustum culling, occlusion culling, backface culling, mesh culling, and the like.

In conventional approaches, the ray-object intersection test typically is performed on a per-ray basis, and thus involves a significant number of calculations to be performed for each ray. Although certain traversal acceleration structures, such as BVHs, can accelerate the process, the reliance of conventional techniques on calculating intersections in Cartesian space still hinders the overall efficiency. Accordingly, in at least one embodiment, the graphics pipeline 114 implements a frustum-object intersection test stage 128 that both bounds subsets of potentially coherent rays into a frustum and operates with a hemisphere in a spherical coordinate system to detect the intersection of the frustum with a bounding volume of a corresponding geometric object before investigating the potential intersection of each ray of the subset with the geometric object intersected by the frustum.

Thus, a pipeline front-end stage 130 of the graphics pipeline 114 receives the input 124 and processes the input 124 to generate a set of rays that are to be used to interrogate the scene and generates a 3D representation of the scene to be rendered into a corresponding rendered frame, including a 3D model of the scene, the viewpoint, the image plane details (including position, resolution, and the like), and then issues one or more function calls 132 to the API 120 to initiate ray-object intersection tests for some or all of the generated rays using the information representing the scene. The API 120 instructs the frustum-object intersection test stage 128 to perform the ray-object intersection tests using one or more of the techniques described herein to generate intersection test results 134 that represent any detected intersections of rays with corresponding objects in the scene. The intersection test results 134 are then provided to a pipeline back-end stage 136, which uses the represented ray-object intersections to further the rendering process. For example, in a rasterization-based rendering process, the intersection test results 134 can be used to identify and cull primitives outside of the view frustum, to identify and cull primitives occluded by other primitives/objects in the foreground, and the like. In a ray-tracing-based rendering process, the ray-object intersections can be used to inform the color and/or luminosity of corresponding pixels of the resulting rendered frame 126.

As a general overview of the operation of the frustum-object intersection test stage 128 of some embodiments, the frustum-object intersection test leverages both the observation that subsets of rays in certain contexts, like primary visibility, are relatively coherent and the use of hemispherical projection to more efficiently evaluate potential ray-object intersections than conventional per-ray, Cartesian-based intersection test schemes. In at least one embodiment, a subset of rays expected to be relatively coherent are bound by a frustum in Euclidean space (e.g., the scene coordinate system). A central ray that extends from the camera point through the center of the frustum is identified and a transform matrix that converts the frustum from the Cartesian world coordinate system to a spherical coordinate system with the central ray defining the Z-axis is determined. A hemisphere centered on the Z-axis/central ray having a specified radius is defined. The radius may be set to, for example, 1 (or unity) in some embodiments, while in other embodiments the radius may be specified by, for example, an arbitrary number, a number representative of a minimum or maximum extent of some or all rays subject to testing, and the like. A circle of a sphere that bounds the frustum where it intersects the hemisphere is identified as the "frustum circle." Thereafter, a BVH or other bounding volume acceleration structure can be traversed, and for each node to be tested, the bounding volume at that node is then bound by a sphere (unless the bounding volume is already a sphere) in the world coordinate system and the bounding sphere is then projected onto the hemisphere using the transform matrix to determine a projected circle of a sphere (the "bounding circle") representing the bounding sphere in the spherical coordinate system. Whether the frustum and the bounding sphere (and thus, effectively, the bounding volume) intersect is then determined from (1) whether the bounding sphere is within a specified distance of the frustum origin and (2) whether the frustum circle and the bounding circle overlap or otherwise intersect. If they intersect, the frustum and bounding object are identified as intersecting (that is, a "hit"), and if the circles do not intersect, the frustum and bounding object are identified as not intersecting (that is, a "miss"). In the event of a detected intersection, the current branch/path of bounding volume acceleration structure can continue to be recursively traversed until there is no further intersections or an intersection at a leaf node representing a graphics primitive is detected. At that point, the individual rays bound in the frustum can be tested against the geometry of the graphics primitive to determine whether there is a ray-object intersection for the ray of interest and the graphics primitive. This process is described in greater detail below with reference to FIGS. 2-8, with FIGS. 2 and 3 describing a process for determining the frustum transform matrix and defining the frustum circle, FIG. 4 describing a process for traversing a BVH or other structure, FIGS. 5 and 6 describing a process of determining the bounding circle for an object of interest and testing for intersection using the frustum circle, and FIGS. 7 and 8 describing a further application of this technique for intersection testing for objects subjected to motion.

Figure 2:
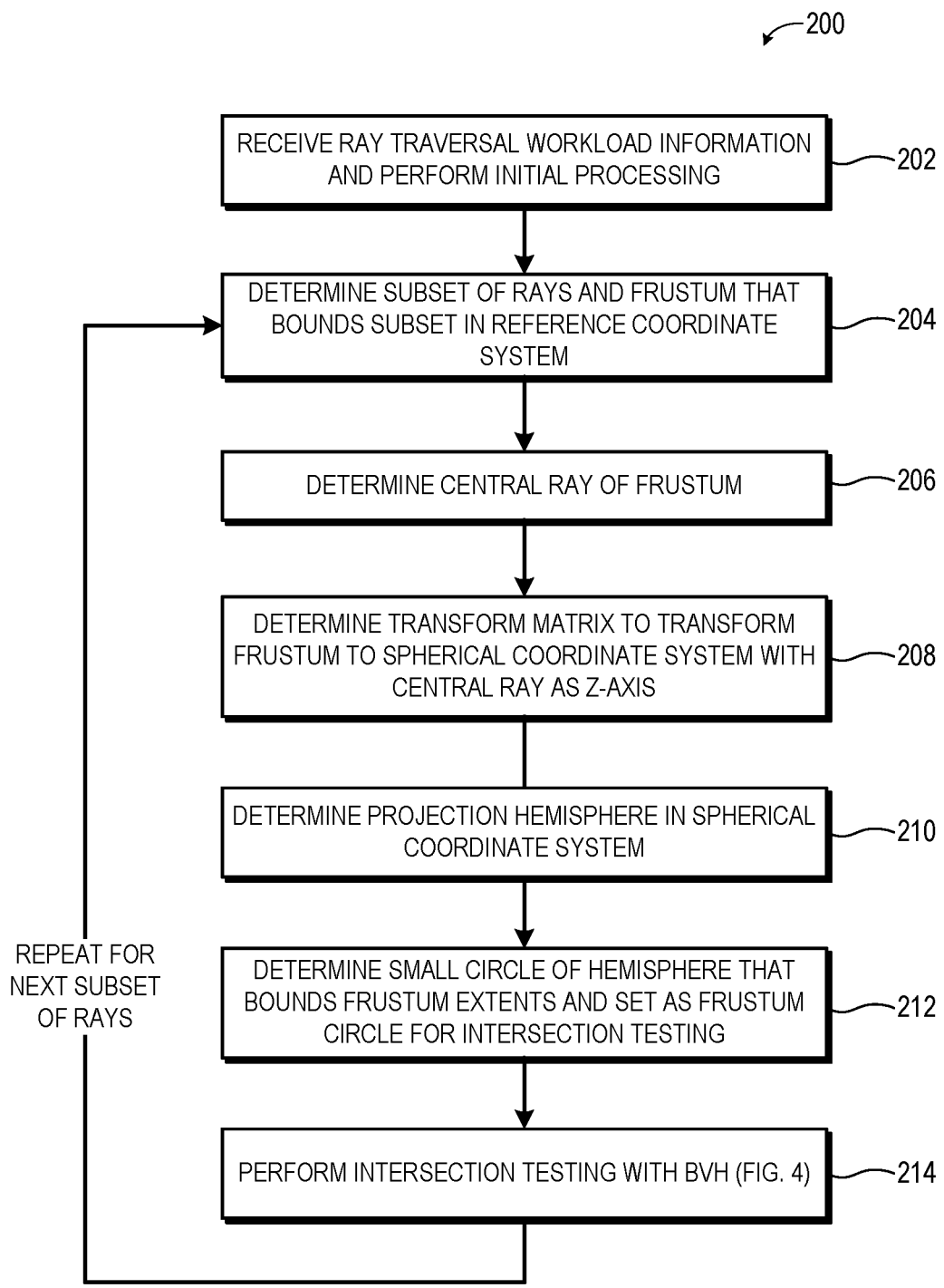
FIG. 2 is a flow diagram illustrating a method for determining a frustum representing a subset of rays and converting the determined frustum to a hemisphere-projected frustum circle in accordance with some embodiments.

FIG. 2 illustrates an example method 200 for performing the frustum circle determination subprocess of the frustum-object intersection test stage 128 (hereinafter, "the intersection test stage 128" for brevity) in accordance with some embodiments. To facilitate understanding, the method 200 is described below with reference to FIG. 3, which depicts an example implementation 300 of the method 200. The method 200 initiates at block 202 with the stage 128 receiving a representation of the ray traversal workload for which ray tracing is to be performed, which as noted above, can be provided through one or more function calls to an API 120, with the functional call(s) having pointers or other identifier of a location of the one or more data structures containing the data for this representation. This data can include one or more models of the scene being rendered, viewpoint information, and in some instances a set of rays generated by the software application 116. The intersection test stage 128 then performs the initial processing to prepare for intersection testing using this information, including any prefiltering of geometric objects, coordinate system transformations, and the like, and in the event that a set of rays is not already generated, generating a set of rays that project from the camera viewpoint through corresponding pixels of the image frame into the scene represented by the 3D model(s).

At block 204, the intersection test stage 128 processes the set of rays to identify one or more subsets of rays that are substantially coherent with other rays of the same subset. To illustrate, the rays under consideration can be categorized as primary rays, ambient occlusion/shadow rays, and secondary rays (modeling light reflections). Primary rays share the same or similar origin as the camera point and have similar directions. As such, a subset of all primary rays going through an image tile (e.g., 8×8 pixels) could be identified as included in a corresponding subset. Ambient occlusion rays or shadow rays are similar to primary rays in that they have the same or similar origin as the camera point, but with wider range of directions while still not being entirely random, and thus may be similarly grouped into a subset. As for secondary rays, in some embodiments such rays are sorted or otherwise binned based on origin, direction, or other properties of the ray and scene data, and a subset is then formed based on selection of a specified pre-selected number to create the frustum. In this case, ray sort/binning facilitates with providing a minimum degree of coherency within the frustum. Then, for a selected subset of rays, the intersection test stage 128 determines a frustum 302 in the Cartesian coordinate system 304 of the scene (hereinafter, the "world coordinate system 304") that bounds the rays of the selected subset. As shown, the frustum 302 extends in a direction substantially parallel with the rays of the subset from the camera 306 (or viewpoint 306) and contains all rays of the subset. Note that in other embodiments, the point 306 can instead be a shading hit point or another 3D point representing the origin of frustum 302. In the depicted example, the frustum 302 is a frustum of a rectangular pyramid extending from the camera 306, but the 3D volume that forms the basis of the frustum 302 can be implemented using any of a variety of volumes, such as a circular or elliptical cone, a triangular pyramid (tetrahedron), a pentagonal pyramid, a hexagonal pyramid, or more generally, an N-polygon pyramid with N >=2. Any of a variety of well-known or proprietary techniques may be used to determine the frustum 302 suitable for binding the subset of rays. For example, in some embodiments the software application 116 or API 120 defines the frustum shape. For example, for primary rays, the frustum origin can be set as at or behind the camera eye, and the frustum shape set to a four-sided pyramid, with each side matching a pixel or image tile. For secondary rays, the frustum shape typically is set based on the desired effect (e.g., ambient occlusion, area shadowing, etc.) and using the specified frustum shape to generate the rays for the subset contained therein. More generally, the frustum may be specified by recovering a frustum from the subset of rays by finding the minimum/maximum direction per axis across all rays, and then finding the eye that contains it.

With the frustum 302 determined, at block 206 the intersection test stage 128 identifies a central ray 308 that extends from the camera 306 through the center of the frustum 302 (e.g., through the center of a plane 310 defined by the edge(s) of the frustum 302 and normal to the camera 306). For example, the central ray 308 can be determined by finding the minimum and maximum ray directions per axis (X, Y, Z) of the subset of rays in the frustum 302 and then finding the average ray direction for all rays in the subset and setting this average ray direction as the central ray 308. At block 208, the intersection test stage 128 determines a transform matrix 312 that converts the representation of the frustum 302 from the Cartesian world coordinate system 304 to a spherical coordinate system 314 such that the camera point 306 is set to the origin 318 (0, 0, 0) of the spherical coordinate system 314 and the central ray 308 is set as the Z-axis of the spherical coordinate system 314, and thus the resulting transformed frustum 318 extends "upward" along, and centered around, the Z-axis from the origin 318 (0, 0, 0) of the spherical coordinate system 314. At block 210, the intersection test stage 128 specifies or otherwise determines a projection hemisphere 320 centered on the Z-axis/central ray 308 of the spherical coordinate system 314 and having a radius 322 ("r") set to 1, an arbitrary number, a number representative of a minimum or maximum extent of some or all rays, etc. As described in greater detail below, this projection hemisphere 320 will serve as the foundation upon which bounding volumes are projected in order to detect intersection with the frustum 302.

At block 212, the intersection test stage 128 identifies a frustum circle 324 that is a small circle of a sphere (or in this particular case, a small circle of a hemisphere) that resides on the surface of the projection hemisphere 320 and which contains or otherwise bounds the extents (e.g., perimeter 326) of the transformed frustum 316 that intersects the surface of the projection hemisphere 320. That is, the frustum circle 324 is a circle of a sphere that contains all vertices of the intersection of the transformed frustum 316 and the projection hemisphere 320 in the event that the corresponding cross-section of the transformed frustum 316 at the surface of the projection hemisphere 320 is a polygon, or the frustum is a circle of the sphere that contains the perimeter of transformed frustum 316 where it intersects the surface of the projection hemisphere 320 in the event that the transformed frustum 316 is a circular or elliptical cone.

With the frustum circle 324 defining the projection of the transformed frustum 316 onto the projection hemisphere 320, at block 214 the intersection test stage 128 then proceeds to performing intersection testing using a BVH or other bounding volume acceleration structure on the basis of comparing projections of bounding volumes onto the projection hemisphere 320 and detecting any overlap or intersection between the resulting projection and the frustum circle 324 as indicative of intersection of the frustum 302 and the corresponding bounding volume. The process of block 214 is described in greater detail below with reference to FIG. 4.

With the frustum-bounding volume intersection test performed for the selected subset of rays, the next subset of rays can be selected and the process of blocks 202-214 repeated for this next subset of rays, and so on, until all the identified subsets of rays have been intersection tested according to the techniques described herein, and the intersection test results 134 provided to the pipeline back-end stage 136 for further processing.

Figure 4:
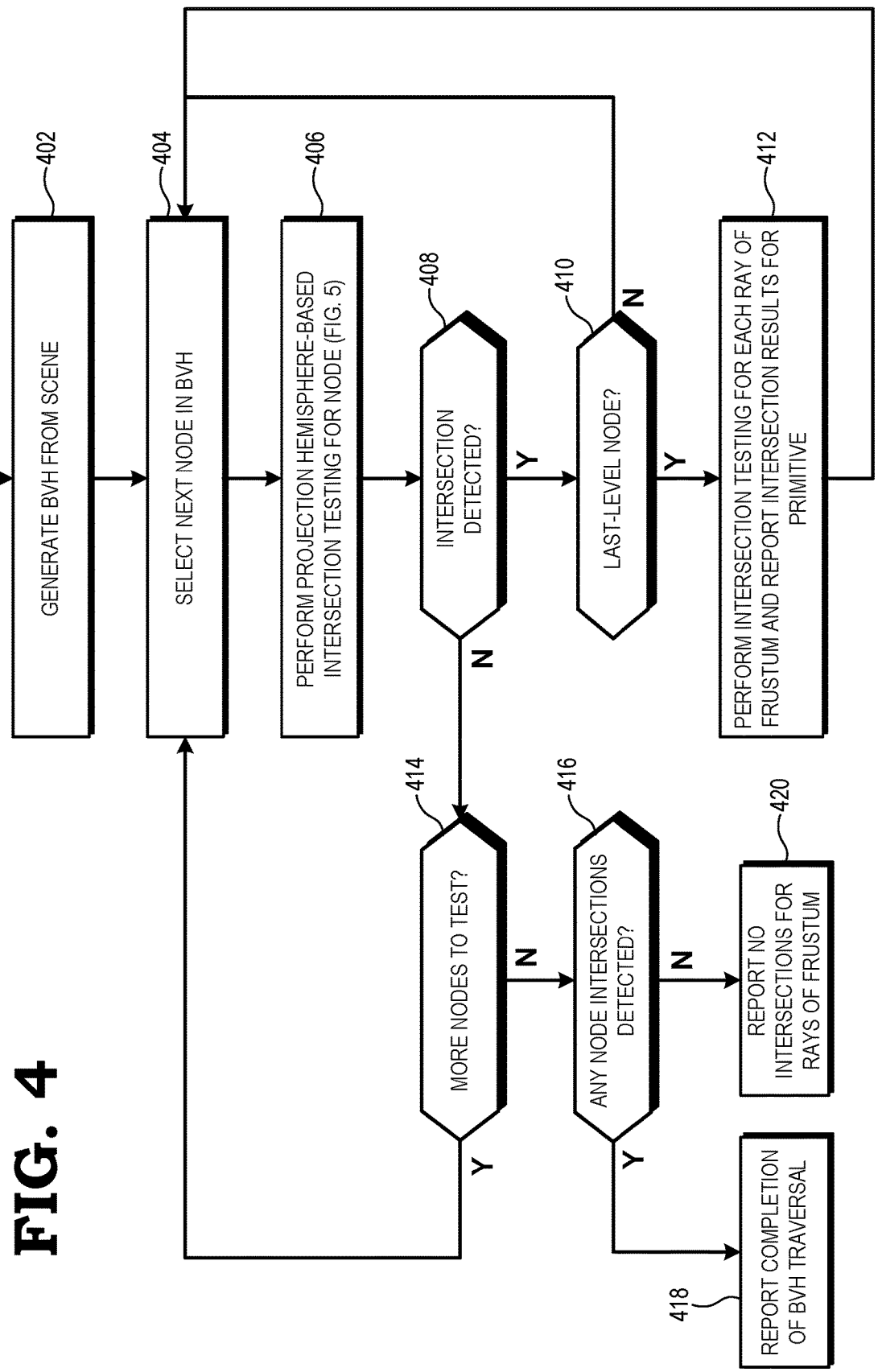
FIG. 4 is a flow diagram illustrating a method for performing a BVH-based ray intersection analysis using a frustum circle in accordance with some embodiments.

FIG. 4 illustrates an example implementation of the projection hemisphere-based intersection testing process of block 214 of method 200 in accordance with some embodiments. For the following, the process is described in the example context of traversal of a BVH, but the process similarly applies to other structures for accelerated bounding volume traversal, such as octrees, nested grids, and the like, using the guidelines provided herein, and thus reference to traversal of a BVH applies to traversal of other such structures unless otherwise noted. As explained above, the processes leading up to the intersection testing process of block 214 involved determining a frustum circle 324 representing the extents of the intersection of the transformed frustum 316 and the surface of the projection sphere 320 (that is, the frustum circle 324 is a circular representation of the projection of the frustum 302, as transformed frustum 316, onto the surface of the projection hemisphere 320). As explained below, the intersection test thus involves projecting a bounding volume under test onto the same projection hemisphere 320 and determining whether there is an intersection (or hit) of the frustum 302 on the bounding volume, and thus whether the subset of rays of the frustum 302 are likely to interest the geometric object represented by the bounding volume.

BVHs and other bounding volume acceleration structures provide an efficient mechanism for detecting frustum-bounding volume intersections by hierarchically generating larger and larger bounding volumes that encompass smaller bounding volumes lower on the hierarchy, until the lowest, or leaf, nodes represent bounding volumes for the triangles or other primitives represented in the 3D model of the scene. Accordingly, the process of block 214 starts at block 202 with the graphics pipeline 114 generating a BVH or other ray traversal acceleration structure for the scene to be rendered using any of a variety of techniques known in the art.

With the BVH created, iterative traversal of the BVH begins. Accordingly, at block 404 the intersection test stage 128 selects the next node of the BVH in the traversal. When starting the traversal, the node selected is the root node (or highest-level parent node), which represents a bounding volume (hereinafter, BV) that encompasses all of the lower-level BVs in the BVH. The bounding volumes of the BVH can comprise any of a variety of suitable bounding volumes, such as axis-aligned bounding boxes (AABBs), object-oriented bounding boxes (OOBBs), bounding spheres, convex hulls, bounding cylinders, and the like. For ease of illustration, examples of the bounding volumes as AABBs are described below.

Figure 3:
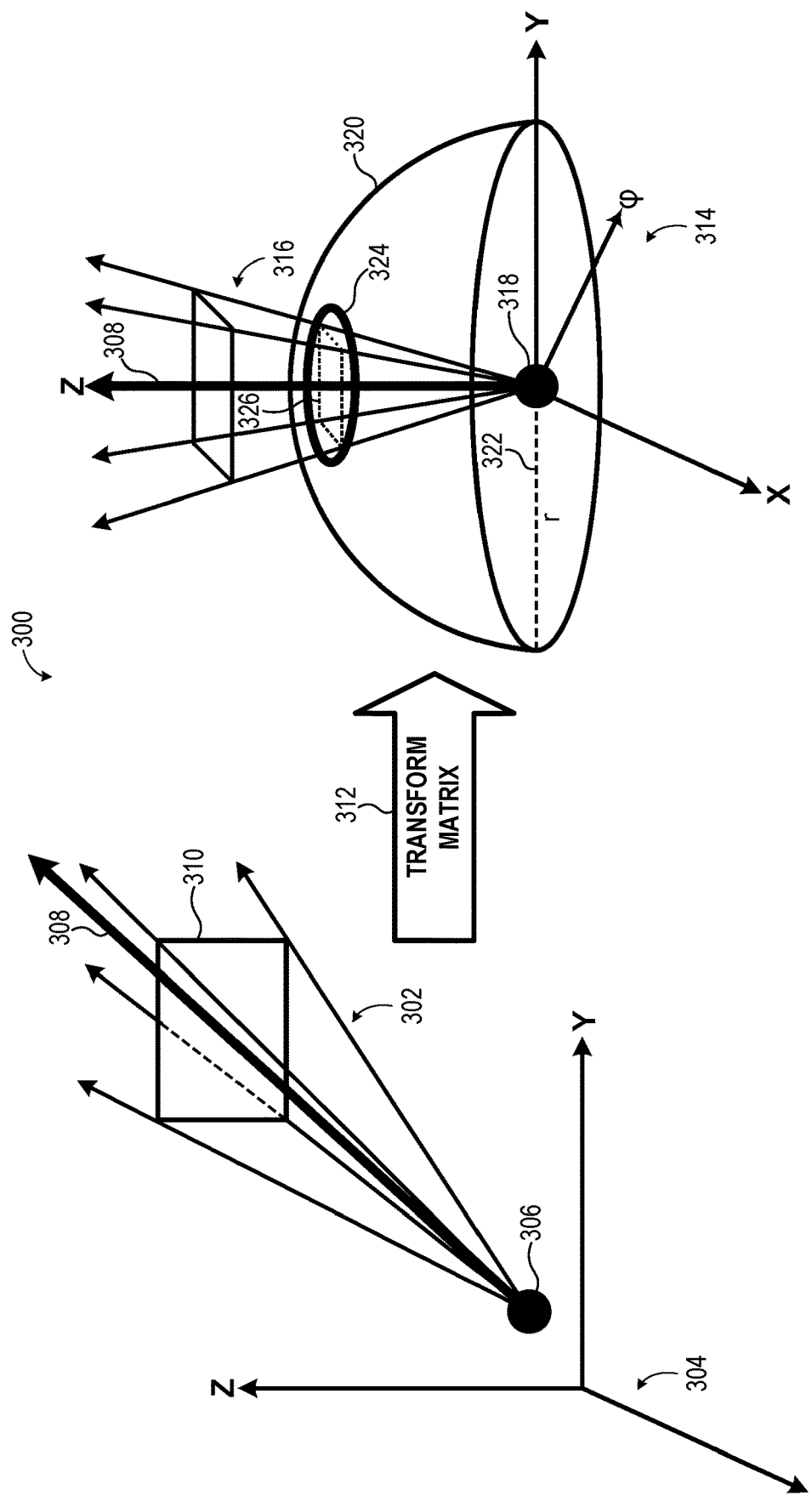
FIG. 3 is a diagram illustrating an example of the method of FIG. 2 in accordance with some embodiments.

With the current node of the BVH selected at block 404, at block 406 the intersection test stage 128 performs a projection hemisphere-based intersection test on the bounding volume represented at the current selected node using the frustum circle 324 (FIG. 3). This test is described in greater detail below with reference to FIG. 5.

In the event that the intersection test returns a result at block 408 that the frustum 402 and the bounding volume represented by the current node of the BVH intersect, then at block 410 the intersection test stage 128 determines whether the current node is a leaf node—that is, the last level node of the branch of the BVH currently being traversed, or a non-leaf node. As noted above, each leaf node represents a graphics primitive or other elemental object of the scene, and thus intersection test results 134 indicating an intersection of the frustum 302 with the bounding volume representing the graphics primitive is indicative that one or more rays of the subset bound by the frustum 302 likewise could intersect the graphics primitive. Accordingly, at block 412 the intersection test stage 128 can perform an intersection test between a ray of interest of the subset and the graphics primitive represented by the current node of the BVH using any of a variety of well-known individual ray intersection testing processes known in the art. This per-ray intersection test then can be repeated for some or all of the rays of the subset bound by the frustum 302. The process of block 214 then returns to block 404 for further traversal of the BVH for other geometric objects of the scene, and the process is repeated until the BVH has been traversed.

Returning to block 408, in the event that intersection test returns a result that indicates that the frustum 302 and the bounding volume represented by the current node of the BVH do not intersect (that is, there is a miss), then at block 414 the intersection test stage 128 determines whether there are any more nodes of the BVH to test. If so, then the intersection test stage 128 returns to block 404 to select the next node of the BVH for testing. Otherwise, if all eligible nodes of the BVH have been tested, then at block 416 the intersection test stage 128 determines whether any previous iterations of the subprocess of blocks 404-412 for nodes of the BVH being tested had intersections detected for the corresponding node. If so, then at block 418 the intersection test stage 128 reports that BVH traversal is complete and returns intersection test results 134 (FIG. 1) that identify the ray/object intersections detected at the corresponding the intersection tests performed at iterations at block 412. Otherwise, at block 420 the intersection test stage 128 reports that no ray/object intersections were detected during the traversal of the

BVH.

Figure 5:
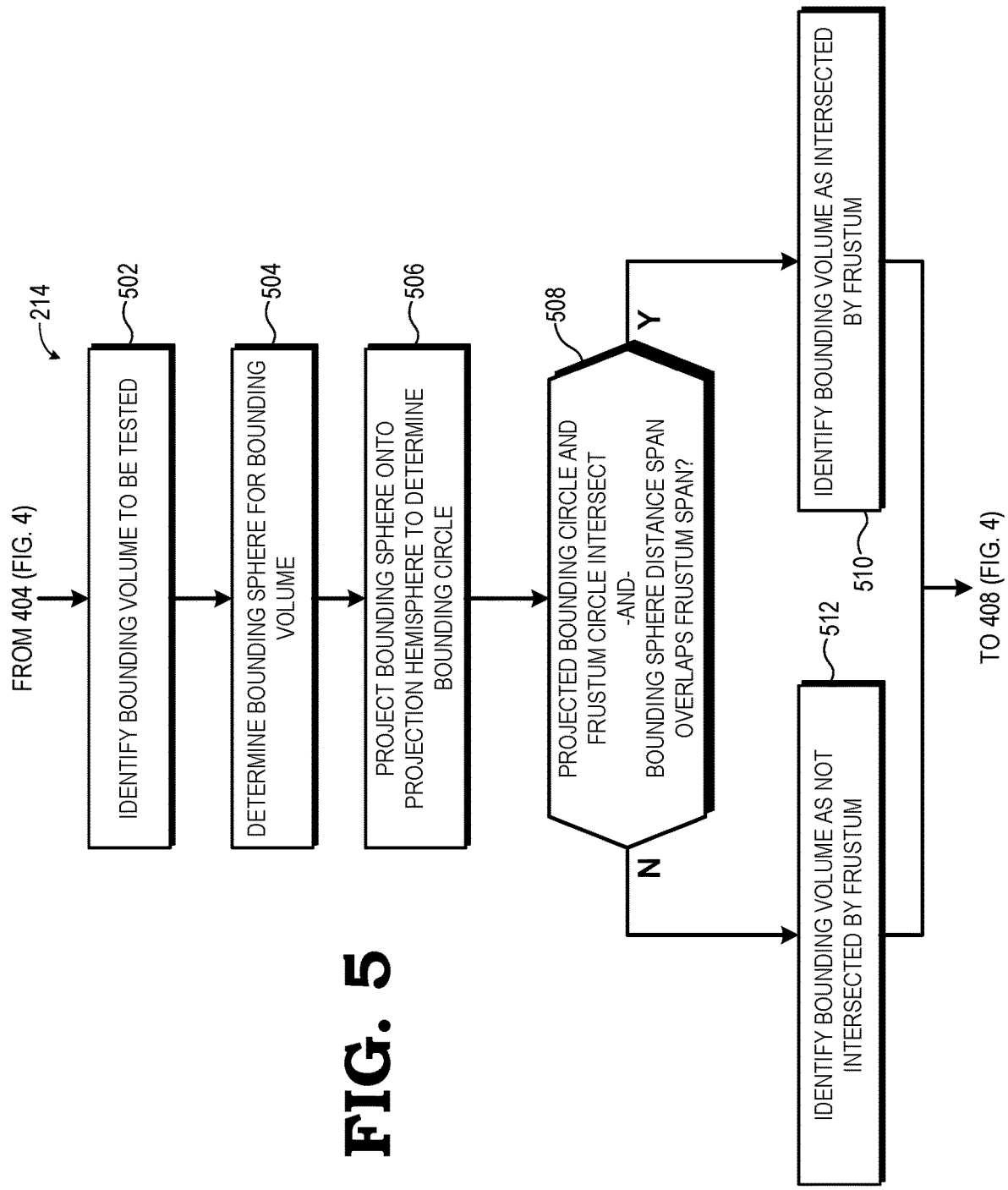
FIG. 5 is a flow diagram illustrating a sub-process of the method of FIG. 4 for detecting whether a bounding volume of a node of a BVH intersects a frustum based on comparison of a hemispherical projection of the bounding volume to a frustum circle in accordance with some embodiments.
Figure 6:
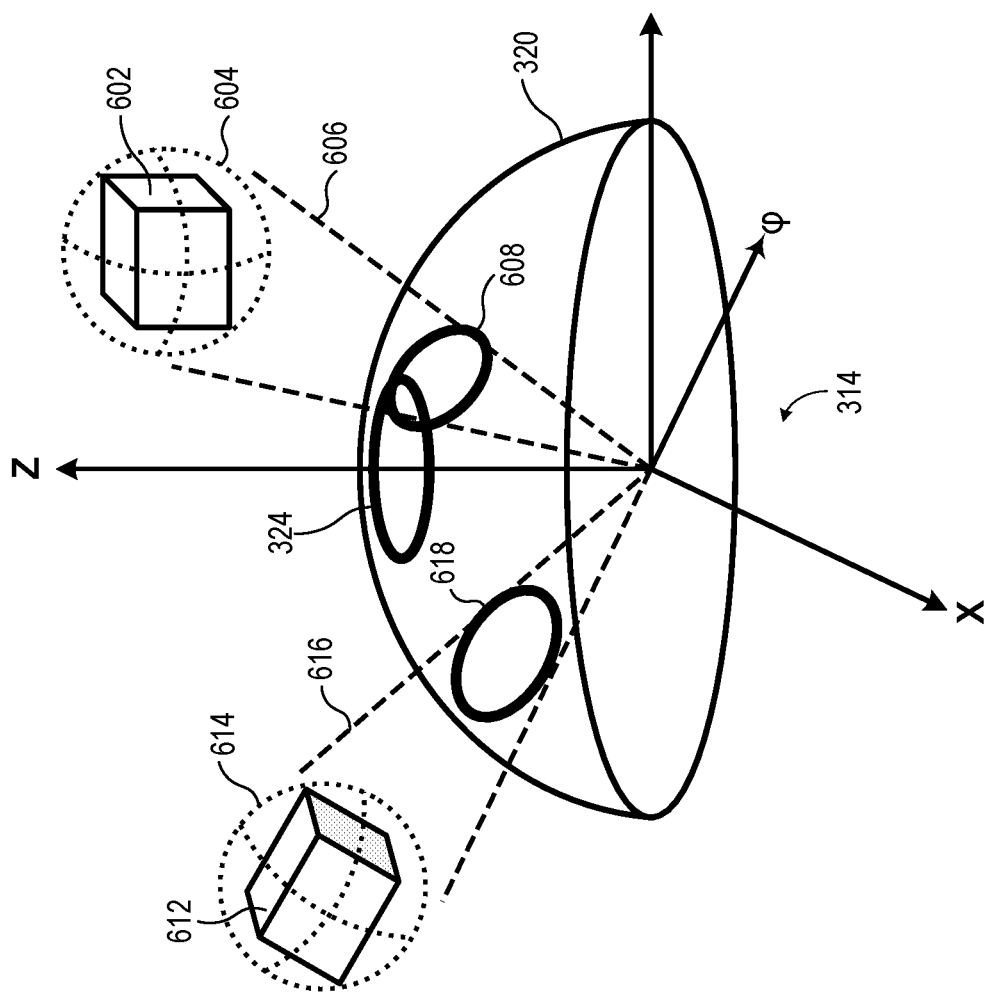
FIG. 6 is a diagram illustrating examples of the sub-process of FIG. 5 in accordance with some embodiments.

FIG. 5 illustrates the projection hemisphere-based intersection test of block 406 of FIG. 4 in accordance with some embodiments. To facilitate understanding, this process is described with reference to an example implementation of the process as illustrated in FIG. 6. As explained above, an iteration of the projection hemisphere-based intersection test of block 406 is initiated with the selection of the next node of a BVH or other ray traversal acceleration structure at block 404 of FIG. 4. Accordingly, at block 502, the intersection test stage 128 identifies the particular bounding volume represented by the currently selected node of the BVH. As explained above, any of a variety of bounding volume types can be employed in a BVH, such an AABB, an OOBB, a bounding sphere, and the like. As such, the bounding volume associated with the current node of the BVH can be represented as minimum and maximum vertices in the Cartesian world coordinate system for AABBs or in the object-local Cartesian coordinate system for OOBBs, a center point and radius in the Cartesian world coordinate system for a bounding sphere, and the like.

In the event that the bounding volume is other than a bounding sphere, at block 504 the intersection test stage 128 determines a bounding sphere in the world coordinate system that binds the entirety of the non-spherical bounding volume. For example, if the bounding volume is an AABB, then the bounding sphere would encompass all vertices (and thus the extents) of the AABB. If the bounding volume associated with the node is already a bounding sphere in the corresponding coordinate system, then block 504 can be bypassed for the current node.

At block 506, the intersection test stage 128 transforms the bounding sphere determined at block from the world coordinate system to the spherical coordinate system 314 (FIG. 3) of the projection hemisphere 320 using the transform matrix 312 used to transform the frustum 302 to generate the transformed frustum 316 as described above with reference to FIGS. 2 and 3. To illustrate, as an initial process, the bounding sphere is transformed to "frustum space" using the world-to-frustum transform 312. The radius "r" and angle ("theta") between the sphere center to the Z-axis are then identified, with theta=arc cos(z/r), the center. The transformed bounding sphere is then projected onto the surface of the projection hemisphere 320, and the resulting circle of a sphere (or circle of a hemisphere) on the surface of the projection hemisphere 320 is designated as the BV circle for the bounding volume of the current node of the BVH.

Conceptually, the intersection test can be understood as relying on intersecting two cones, with the use of hemispherical space providing for simpler analysis of this intersection. One cone is given by a ray frustum. The second cone represents the solid angle subtended by the AABB (or other bounding volume) to be tested. As cone-cone intersection computation is complex, the test instead considers both the solid angle subtended by each cone and the range of distances occupied by frustum or bounding box within the cone. The hemisphere construct simplifies the process by constructing the surfaces of intersection between unit-radius hemisphere and each cone (e.g., circles 324 and 618). These are circles because both cones share their origin, thus their directions are perpendicular to hemisphere surface. Therefore, intersection between the surface of each cone and the hemisphere surface leads to a circle embedded in the hemisphere surface. The second simplification is to rotate our hemispherical coordinate frame to align with frustum cone. This facilitates description of the projection of the frustum cone onto hemisphere surface by using the theta angle in spherical coordinates. Given this, if two cones overlap, the region of space within the overlap is contained by both cones. When this region of space is projected onto the hemisphere surface, the projected region would be contained in the overlap of the two circles on the surface of the hemisphere. If the cones do not overlap in space, neither do their projections onto hemisphere surface. The previous part describes cone intersection through solid angle thinking. Considering just a solid angle typically is not sufficient because this definition creates semi-infinite cones that extend into infinite distance away from hemisphere center. The ray frustum may have [min, max] extents while the bounding box always does, and so the intersection test takes this into account. Further, when it is determined that the circles of both cones overlap (as in solid angles do), the intersection test then operates to verify that the distance intervals do as well in order to conclude that there is a potential intersection between the frustum and the bounding volume.

Accordingly, to determine whether the frustum 302 and the bounding volume of the current node intersect, at block 508 the intersection test stage 128 evaluates the frustum circle 324 and the BV circle to determine if (1) there is angular overlap, that is, any overlap between the two circles (that is, do the two circles intersect at any point along their peripheries) and (2) there is distance overlap, that is, whether the bounding sphere distance span overlaps the frustum span (that is, do the distances overlap). Note that in the illustrated embodiment, both overlap conditions should be met in order to conclude there is an intersection between the frustum 302 and the bounding volume (and thus potentially an intersection between ray(s) of the frustum 302 and the graphics object contained by the bounding volume).

The span/distance overlap test may be viewed as a depth test of sorts, and includes, in some embodiments, verification as to whether two intervals overlap: (1) a frustum distance span, and (2) a bounding sphere distance span. For setup for this test, a distance A is defined as the maximum distance for the frustum 302 from the frustum "eye" (point 306), which typically depends on the ray extents and may be set to infinity or some large value initially. Further, a minimum distance for the frustum 302 may also be defined based on the ray extents, and which may be set to, for example, 0 initially. Further, a distance B is defined as the distance from the frustum eye (point 306) to the point on the surface of the bounding sphere closest to the frustum eye bounding sphere (e.g., sphere 604), which may be calculated as the distance from the frustum eye to the center of the bounding sphere minus the radius of the bounding sphere. The test then compares distances A and B, as well as the sufficiency of distance B relative to the radius of the bounding sphere itself. For example, in some embodiments, sufficient distance overlap (or distance "hit") is determined when distance B is not greater than A (that is, B<=A) and distance B is more than twice the radius of the bounding sphere (that is, B >2*sphere radius), and insufficient distance overlap (or distance miss) is determined when distance B is greater than distance A (that is, B>A) or when distance B is not greater than twice the bounding sphere radius (that is, B<=2*sphere radius).

If both the frustum circle 324 and the BV circle overlap and their distances overlap, then at block 510 the intersection test stage 128 identifies the frustum 302 as intersecting the bounding volume represented by the current node, formats the corresponding portion of the intersection test results 134 accordingly, and the process proceeds to block 408 (FIG. 4) with a positive intersection result (that is, a "hit") for the current node of the BVH. Otherwise, if the two circles do not overlap in both angle and distance, then at block 512 the intersection test stage 128 identifies the frustum 302 as not intersecting the bounding volume represented by the current node, formats the corresponding portion of the intersection test results 134 accordingly, and the process proceeds to block 408 with a negative intersection result (that is, a "miss") for the current node of the BVH.

FIG. 6 illustrates two examples of the projection hemisphere-based intersection test of block 406 of FIGS. 4 and 5 in accordance with some embodiments. In a first example, an AABB 602 associated with a node under evaluation (block 502) is bound in a corresponding bounding sphere 604 (block 504), and the bounding sphere 604 is transformed to the spherical coordinate system 314 of the projection hemisphere 320 using the frustum transform matrix 312 (FIG. 3) and then projected (projection 606) onto the surface of the projection hemisphere 320, and the circle of a sphere defining the intersection of the projection of the transformed bounding sphere and the surface of the projection hemisphere 320 is identified as a bounding circle 608 representing the bounding sphere 604 and thus representing the AABB 602 (block 506). In this example, the bounding circle 608 and the frustum circle 324 overlap, and thus the frustum 302 is identified as intersecting the AABB 602 (blocks 508 and 510).

In the second example of FIG. 6, an OOBB 612 associated with a node under evaluation (block 502) is bound in a corresponding bounding sphere 614 (block 504) based on the object local coordinate system. In this case, the bounding sphere 614 undergoes a preparation transform to transform the bounding sphere 614 (with origin as 3D point in local object coordinate system and radius as a scalar) using an object-to-world coordinate system transform, and then transform the resulting transformed bounding sphere to the spherical coordinate system 314 of the projection hemisphere 320 using the frustum transform matrix 312 (FIG. 3). The resulting twice-transformed bounding sphere is projected (projection 616) onto the surface of the projection hemisphere 320, and the circle of a sphere defining the intersection of the projection of the twice-transformed bounding sphere and the surface of the projection hemisphere 320 is identified as a bounding circle 618 representing the bounding sphere 614 and thus representing the OOBB 612 (block 506). In this example, the bounding circle 618 and the frustum circle 324 do not overlap, and thus the frustum 302 is identified as not intersecting (missing) the OOBB 612 (blocks 508 and 510).

Figure 7:
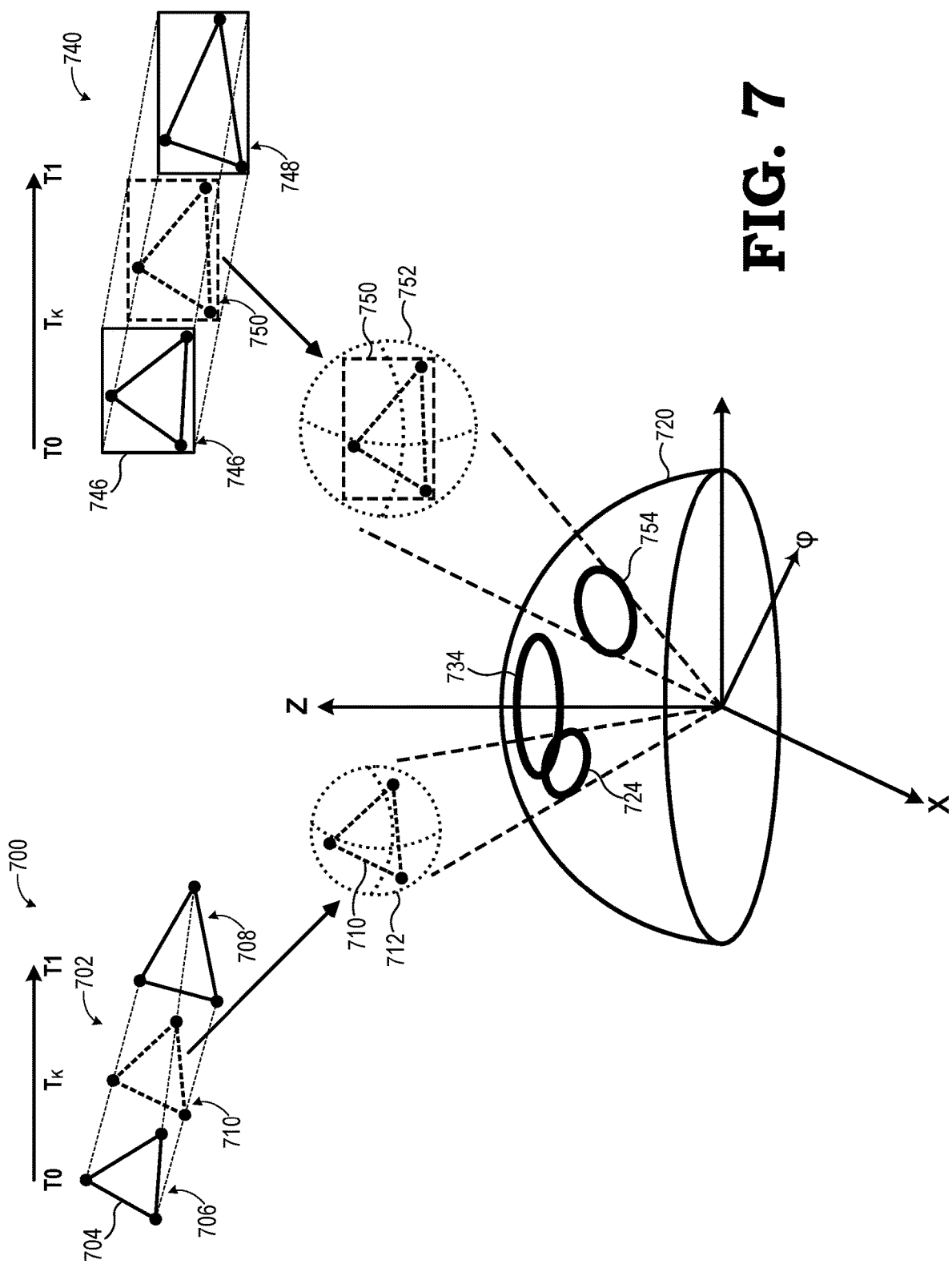
FIG. 7 is a diagram illustrating a process for ray intersection for a geometric object subject to motion using a hemispherical-projection-based intersection test process in accordance with some embodiments.

FIGS. 7 and 8 illustrate adaptations of the projection hemisphere-based frustum-BV intersection test process described above for implementations employing a motion-blur process in accordance with some embodiments. Virtual objects may be moving relatively rapidly in the scene being rendered, and it may be desirable to introduce motion blur for such objects in the rendered frame to better simulate how the human eye perceives objects in motion. Typically, a motion blur process is based on use of a virtual camera shutter having an exposure start time T0 and exposure end time T1, with a geometric object having an initial pose at T0 and a final pose at T1, and then to "smear" the geometric object across the rendered frame from the initial pose and the final pose based on, for example, linear interpolation between the initial and final poses. As such, the geometric object occupies a volume of the scene that extends between the initial pose and the final pose. A ray tracing process then must account for which rays at a given point in time between [T0, T1] intersect the geometric object in its corresponding pose at that same point in time.

FIG. 7 illustrates approaches for ray-object intersection testing for geometric object with motion in a same-timestamp ray subset configuration. In this approach, a frustum is formed for a subset of rays that represent the same point in time, or timestamp, Ti. As illustrated by approach 700, individual primitives of an object subject to motion can be ray intersection tested. In this approach, a linear interpolation 702 of a primitive 704 between its initial pose 706 at time T0 and its final pose 708 at time T1 is performed to determine an intermediate pose 710 of the primitive 704 at time Ti. A bounding sphere 712 for the intermediate pose 710 of the primitive 704 is determined and then transformed to a spherical coordinate space of a projection hemisphere 720 and then projected onto the surface of the projection hemisphere 720 to determine a BV circle 724. In this case, the projection hemisphere 720 was generated from the spherical transform of a frustum that binds a subset of the rays at time Ti and resulted in generation of a frustum circle 734 from that frustum using the process described above. In this case, the BV circle 724 and the frustum circle 734 for time Ti overlap (both angularly and in distance), and thus the intersection test stage 128 concludes that some or all of the rays at time Ti of the frustum are likely to intersect with the primitive 704 at its interpolated pose 710 at time Ti.

As illustrated by approach 740, a linear interpolation 742 of the BV 744 of a primitive (or larger portion of a geometric object subject to motion) instead can be performed between an initial pose 746 of the BV 744 at time T0 and the final pose 748 of the BV 744 at time T1 to determine an intermediate pose 750 of the BV 744 at time Ti. A bounding sphere 762 for the intermediate pose 750 of the BV 744 is determined and then transformed to a spherical coordinate space of the projection hemisphere 720 and then projected onto the surface of the projection hemisphere 720 to determine a BV circle 754. In this case, the BV circle 754 and the frustum circle 734 for time Ti do not overlap, and thus the intersection test stage 128 concludes that none of the rays at time Ti of the frustum are likely to intersect with the BV 744 at its interpolated pose 750 at time Ti.

FIG. 8 illustrates a different approach that is not limited to the frustum representing only rays with the same timestamp. In this approach, a frustum bounding rays of different time stamps between T0 and T1 is identified, transformed to a spherical coordinate system, used to create a projection hemisphere 820, and further used to define a frustum circle on the surface of the projection hemisphere 820 using the process described above. Then, to determine whether rays of different timestamps may intersect a primitive or other larger object subject to motion, both the initial pose 806 at time T0 and the final pose 808 at time T1 of the object 804 being tested are encapsulated in bounding spheres 810 and 812, respectively, and then the bounding spheres 810 and 812 are connected to create a bounding capsule volume 814 that represents the sweep of the bounding sphere 810 to the bounding sphere 810 through the word coordinate space from time T0 to time T1. This bounding capsule volume 814 is then transformed to the spherical coordinate system of the projection hemisphere 820 and then projected onto the surface of the projection hemisphere 820 to define a bounding loop 836 that represents the intersection of the projected bounding capsule volume 814 with the surface of the projection hemisphere 820. Then, as with the other circle tests, at least one ray of the frustum and the object 804 may intersect when the bounding loop 836 and the frustum circle 834 overlap (both angularly and in distance), and otherwise predict that no rays of the frustum and the object 804 intersect when there is no distance and/or angular overlap between the bounding loop 836 and the frustum circle 834. In the event of predicted intersection, then individual rays can be tested against the corresponding pose of the object 804 at the timestamp of the ray to identify which rays intersect the object 804 and for which timestamps.

In some embodiments, the apparatus and techniques described above are implemented in a system including one or more integrated circuit (IC) devices (also referred to as integrated circuit packages or microchips), such as the system 100 described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for ray intersection detection in a graphics processing system, the method comprising:
   determining a frustum circle by projecting a frustum that bounds a subset of rays projected into a scene onto a surface of a hemisphere formed in a spherical coordinate system;
   determining a bounding circle by projecting a bounding sphere onto the surface of the hemisphere, the bounding sphere bounding one of a graphics primitive or a bounding volume; and
   identifying an intersection between the frustum and the graphics primitive or bounding volume responsive to an overlap between the frustum circle and the bounding circle.

2. The method of claim 1, further comprising:
   determining the subset of rays based on a substantial coherency between the rays of the subset.

3. The method of claim 1, wherein the frustum is based on a three-dimensional volume extending from a viewpoint in a Cartesian coordinate system for the scene.

4. The method of claim 3, wherein projecting the frustum comprises:
   determining a central ray that passes from the viewpoint to a center of the frustum;
   determining a transform matrix to transform the frustum from the Cartesian coordinate system to transformed frustum in a spherical coordinate system with the viewpoint centered at an origin of the spherical coordinate system and the central ray forming an axis of the spherical coordinate system; and
   determining a projection hemisphere centered around the axis in the spherical coordinate system and intersecting the transformed frustum.

5. The method of claim 4, wherein determining the frustum circle comprises determining the frustum circle as a circle on the surface of the projection hemisphere that encompasses an intersection between the transformed frustum and the surface of the projection hemisphere.

6. The method of claim 4, wherein determining the bounding circle comprises:
   determining the bounding sphere in the Cartesian coordinate system of the scene;
   transforming the bounding sphere from the Cartesian coordinate system to the spherical coordinate system using the transform matrix; and
   projecting the transformed bounding sphere onto the surface of the projection hemisphere, wherein the bounding circle comprises the projected transformed bounding sphere on the surface of the projection hemisphere.

7. The method of claim 6, wherein:
   the bounding volume is a bounding volume at a node of a bounding volume hierarchy.

8. The method of claim 7, further comprising:
   responsive to the frustum circle and the bounding circle overlapping and to the node being a leaf node of the bounding volume hierarchy, performing a ray intersection test for each of at least a portion of the subset of rays for a graphics primitive bound by the bounding volume.

9. The method of claim 7, further comprising:
   responsive to the frustum circle and the bounding circle overlapping and to the node being a non-leaf node of the bounding volume hierarchy, traversing to a next node in the bounding volume hierarchy; or
   responsive to the frustum circle and the bounding circle not overlapping and to the node being a non-leaf node of the bounding volume hierarchy, ceasing further traversal of a branch of the bounding volume hierarchy associated with the node.

10. A method for ray intersection detection in a graphics processing system, the method comprising:
    determining a frustum circle by projecting a frustum onto a surface of a hemisphere formed in a spherical coordinate system, the frustum bounding a subset of rays projected into a scene being rendered and with different timestamps between a start time and an end time of a motion process;
    determining a bounding loop for a graphics primitive subject to the motion process by projecting a bounding capsule onto the surface of the hemisphere, the bounding capsule bounding an initial pose of the graphics primitive at the start time and a final pose of the graphics primitive at the end time; and
    identifying an intersection between at least one ray bound by the frustum and the graphics primitive responsive to an overlap between the frustum circle and the bounding loop.

11. The method of claim 10, wherein the frustum is based on a three-dimensional volume extending from a viewpoint in a Cartesian coordinate system for the scene.

12. The method of claim 11, wherein:
    projecting the frustum comprises:
       determining a central ray that passes from the viewpoint to a center of the frustum;
       determining a transform matrix to transform the frustum from the Cartesian coordinate system to transformed frustum in a spherical coordinate system with the viewpoint centered at an origin of the spherical coordinate system and the central ray forming an axis of the spherical coordinate system; and
       determining a projection hemisphere centered around the axis in the spherical coordinate system and intersecting the transformed frustum;
    determining the frustum circle comprises determining the frustum circle as a circle on the surface of the projection hemisphere that encompasses an intersection between the transformed frustum and the surface of the projection hemisphere; and
    determining the bounding loop comprises:
       determining the bounding capsule in the Cartesian coordinate system of the scene;

transforming the bounding capsule from the Cartesian coordinate system to the spherical coordinate system using the transform matrix; and projecting the transformed bounding capsule onto the surface of the projection hemisphere, wherein the bounding loop comprises the projected transformed bounding capsule on the surface of the projection hemisphere.

13. A processing system comprising:

one or more central processing units (CPUs);

one or more graphics processing units (GPUs); and one or more memories coupled to the one or more CPUs and the one or more GPUs, the one or more memories storing instructions configured to manipulate at least one of the one or more CPUs or the one or more GPUs to:

determine a frustum circle by projecting a frustum that bounds a subset of rays projected into a scene onto a surface of a hemisphere formed in a spherical coordinate system;

determine a bounding circle by projecting a bounding sphere onto the surface of the hemisphere, the bounding sphere bounding one of a graphics primitive or a bounding volume; and identify an intersection between the frustum and the graphics primitive or bounding volume responsive to an overlap between the frustum circle and the bounding circle.

14. The processing system of claim 13, wherein the instructions are further configured to manipulate at least one of the one or more CPUs or the one or more GPUs to:

determine the subset of rays based on a substantial coherency between the rays of the subset.

15. The processing system of claim 13, wherein the frustum is based on a three-dimensional volume extending from a viewpoint in a Cartesian coordinate system for the scene.

16. The processing system of claim 15, wherein the instructions configured to manipulate at least one of the one or more CPUs or the one or more GPUs to project the frustum comprise instructions configured to manipulate at least one of the one or more CPUs or the one or more GPUs to:

determine a central ray that passes from the viewpoint to a center of the frustum;

determine a transform matrix to transform the frustum from the Cartesian coordinate system to transformed frustum in a spherical coordinate system with the viewpoint centered at an origin of the spherical coordinate system and the central ray forming an axis of the spherical coordinate system; and determine a projection hemisphere centered around the axis in the spherical coordinate system and intersecting the transformed frustum.

17. The processing system of claim 16, wherein the instructions configured to manipulate at least one of the one or more CPUs or the one or more GPUs to determine the frustum circle comprise instructions configured to manipulate at least one of the one or more CPUs or the one or more GPUs to determine the frustum circle as a circle on the surface of the projection hemisphere that encompasses an intersection between the transformed frustum and the surface of the projection hemisphere.

18. The processing system of claim 16, wherein the instructions configured to manipulate at least one of the one or more CPUs or the one or more GPUs to determine the bounding circle comprise instructions configured to manipulate at least one of the one or more CPUs or the one or more GPUs to:

determine the bounding sphere in the Cartesian coordinate system of the scene;

transform the bounding sphere from the Cartesian coordinate system to the spherical coordinate system using the transform matrix; and project the transformed bounding sphere onto the surface of the projection hemisphere, wherein the bounding circle comprises the projection of the transformed bounding sphere on the surface of the projection hemisphere.

19. The processing system of claim 18, wherein:

the bounding volume is a bounding volume at a node of a bounding volume hierarchy.

20. The processing system of claim 19, wherein the instructions are further configured to manipulate at least one of the one or more CPUs or the one or more GPUs to:

responsive to the frustum circle and the bounding circle overlapping and to the node being a leaf node of the bounding volume hierarchy, perform a ray intersection test for each of at least a portion of the subset of rays for a graphics primitive bound by the bounding volume.

21. The processing system of claim 20, wherein the instructions are further configured to manipulate at least one of the one or more CPUs or the one or more GPUs to:

responsive to the frustum circle and the bounding circle overlapping and to the node being a non-leaf node of the bounding volume hierarchy, traversing to a next node in the bounding volume hierarchy; or responsive to the frustum circle and the bounding circle not overlapping and to the node being a non-leaf node of the bounding volume hierarchy, ceasing further traversal of a branch of the bounding volume hierarchy associated with the node.

* * * * *